United States Patent
Evans

(10) Patent No.: US 6,898,702 B1
(45) Date of Patent: May 24, 2005

(54) SYSTEM AND METHOD FOR STAGGERED STARTING OF EMBEDDED SYSTEM MODULES IN AN OPTICAL NODE

(75) Inventor: David Lawrence Evans, Belmont, CA (US)

(73) Assignee: Ciena Corporation, Linthicum, MD (US)

( * ) Notice: Subject to any disclaimer, the term of this patent is extended or adjusted under 35 U.S.C. 154(b) by 714 days.

(21) Appl. No.: 09/895,342

(22) Filed: Jun. 29, 2001

(51) Int. Cl.[7] .............................................. G06F 15/177
(52) U.S. Cl. ........................................ 713/2; 398/106
(58) Field of Search ................................ 713/1, 2, 100, 713/401, 502; 398/52, 53, 106, 118, 161

(56) References Cited

U.S. PATENT DOCUMENTS 5,794,031 A * 8/1998 Nakadai ........................ 713/2
6,243,771 B1 * 6/2001 Van Gasteren et al. ....... 710/59
6,691,241 B1 * 2/2004 Taylor .......................... 713/500
6,748,525 B1 * 6/2004 Hubacher et al. .............. 713/1

* cited by examiner

*Primary Examiner*—Thuan Du
(74) *Attorney, Agent, or Firm*—Michael R. Cammarata; Edward Van Gieson; Jason W. Rhodes

(57) ABSTRACT

A system and method for staggering the starting of embedded system modules of an optical node is disclosed. The embedded system modules of an optical node may be communicatively coupled to a shared data resource required by the embedded system modules during a start/restart. The message traffic associated with the embedded system modules accessing the shared data resource is beneficially distributed by staggering the start process of each of a plurality of embedded system modules over a pre-selected time range.

28 Claims, 10 Drawing Sheets

SYSTEM AND METHOD FOR STAGGERED STARTING OF EMBEDDED SYSTEM MODULES IN AN OPTICAL NODE

BACKGROUND OF THE INVENTION

1. Field of the Invention

The present invention relates generally to the booting/rebooting of embedded systems. More particularly, the present invention is directed towards booting/rebooting a plurality of embedded system modules within an optical node of an optical network.

2. Description of Background Art

Wavelength division multiplexed (WDM) optical networks are of interest for optical communication networks, such as long-haul networks and metro area networks. A WDM network typically includes several data channels, with each data channel having a corresponding optical wavelength. A dense wavelength division multiplexed (WDM) optical network typically has twenty or more channels.

FIG. 1 shows an example of a DWDM optical network 100 having a ring topology, although it will be understood that a DWDM optical network may assume a variety of different topologies. A DWDM optical network typically includes two or more optical nodes 105 linked by optical fibers 110 into an optical network 100. Each optical node 105 commonly included elements for passing channels on to downstream nodes using optical amplifiers or optical regenerator elements. Additionally, each optical node 105 is typically coupled to a local tributary network coupled to optical network 100 (not shown in FIG. 1) and includes elements for adding/dropping channels to and from the tributary network.

FIG. 2 is a functional block diagram of an exemplary DWDM optical node 200 developed by ONI Systems Corp. of San Jose, Calif. Optical node 200 includes at least one input port 205 for receiving an optical data stream and at least one output port 210 for communicating an optical data stream with a downstream node. A service interface 215 permits data to be coupled to/from a local tributary network. Optical node 200 may be conceptually divided into functional blocks of elements. Transport section 260 has interfaces for receiving a line-side optical data stream from an upstream node and communicating a line-side optical data stream to a downstream node. Some of the functions that transport section 260 may provide include receiving/transmitting an optical supervisory channel; dividing the received optical signals into working, protection, and supervisory channels; providing protection switching, or amplifying optical signals to boost their signal strength. A multiplex section 270 may include a multi-stage optical multiplexer. The multiplex section 270 aggregates optical signals from the tributary section 280 into the line-side DWDM format. Multiplex section 270 also splits received line-side signals into the individual channels used by a tributary section 280. Tributary section 280 may include transponders to bi-directionally convert optical signals from tributary equipment to the specific frequencies used on the optical transmission line. A common control section 290 provides software administration and control of the node and may include a configuration database and a central control processor.

A DWDM optical node 200 includes a substantial number of opto-electronic and electrical components. Consequently, each major functional block 260, 270, 280, and 290 of an optical node 200 may be further divided into rack-mountable modules (commonly referred to as "circuit packs"). Referring to FIG. 3, a rack 300 includes several shelves 305, with each shelf having several slots for holding a circuit pack 308. Each circuit pack 308 includes one or more electrical components and one or more opto-electronic components mounted to a supporting substrate, such as a printed circuit board. A circuit pack 308 may also include a mechanical sub-structure to provide mechanical strength, provide an electromagnetic interference shield, and facilitate air flow through the rack. Examples of circuit packs are circuit packs containing optical multiplex/demultiplex elements, circuit packs containing optical amplifiers, circuit packs having optical transceivers, and circuit packs having optical switching elements (e.g., a ring switch module). The circuit packs 308 may be coupled to an electronic data bus to permit the circuit packs to communicate electrical data signals with each other. For example, referring to FIG. 3, the node may include one or more local area networks 300 (e.g., an Ethernet back-plane having a databus and hubs) to provide a back-plane data link for circuit packs 308 located in different shelves 305 of a rack 300. A circuit pack 308 may also include one or more optical ports (not shown in FIG. 3) to permit opto-electronic elements of the circuit packs to be coupled together with optical couplers (e.g., segments of an optical fiber).

The use of standardized circuit packs 308 to implement the functional blocks of an optical node 200 provides many commercial advantages, such as the ability to repair or upgrade optical node 200 by swapping circuit packs. However, a DWDM network may require a substantial number of circuit packs 308 in each node. This may lead to a variety of booting/rebooting problems for circuit packs having a microprocessor requiring a central data resource from a processor module 318 to boot/reboot. One problem observed by ONI Systems Corp. of San Jose, Calif. is that during booting/rebooting of node 200 a congestion/overload condition may occur due to the large initial message traffic between circuit packs 300 and the central processor 318 of the control section. This results in an undesirable delay when the modules are started in a boot/reboot process. The delay tends to increase as the number of modules is increased, is exacerbated by a slow bus/hub speed, and also depends upon the speed of the central processor. This delay in the booting/rebooting process may be unacceptable for many applications. Moreover, since both congestion and overloading delays tend to increase rapidly above a threshold level of message traffic, the delays may increase dramatically as the number of modules is increased above a threshold number. Conventional solutions to congestion and overloading, such as increasing the bus speed and the speed of the central processor, would significantly increase the cost of optical node 200.

Therefore, there is a need for a new system and method for starting/restarting the circuit packs in an optical node.

SUMMARY OF THE INVENTION

A system and method is disclosed for staggering the starting of embedded system modules of an optical node. The system and method may be applied to staggering the starting of the embedded system modules during an initial start or a subsequent restart of the embedded system modules. In one embodiment the optical node may comprise a plurality of embedded system modules coupled by a network data bus to an administrative complex having a processor and a shared data resource. The shared data resource includes data that some or all of the embedded system modules need to start, such as provisioning data that informs the embedded system which fiction it needs to perform. Each embedded system module may comprise a microprocessor for administering an opto-electronic component of the optical node. The start of each of a plurality of embedded system modules is staggered over a pre-selected time range, resulting in a distribution of the start order sequence. In one embodiment, the start/restart process of each embedded system module comprises a series of states and the progression of the start process is delayed at a pre-selected state by a time delay that is randomly selected within a range of time delays appropriate for the embedded system module.

One benefit of the present invention is that it can improve the rate at which all of the embedded system modules may be started because the message traffic associated with providing the shared data resource may be beneficially distributed. In one embodiment, the start process of the embedded system modules is staggered over a sufficiently long time range to reduce congestion of the data bus and/or to prevent overloading of the central processor.

Another benefit of the present invention is that a random start order of the embedded system modules can be created that facilitates identifying software timing error defects during a software testing. In a preferred embodiment, random time delays are included in the start process of each embedded system module. The random time delays are selected to create a random start order sequence over a time range selected to emulate a range of time variance likely to occur during field use of the optical node. In this embodiment, software errors are identified during a test phase by initiating a sequence of starts and logging software errors that occur during starting for each random start order sequence that is tested.

The figures depict a preferred embodiment of the present invention for purposes of illustration only. One of skill in the art will readily recognize from the following discussion that alternative embodiments of the structures and methods disclosed herein may be employed without departing from the principles of the claimed invention.

DETAILED DESCRIPTION OF THE PREFERRED EMBODIMENTS

An optical node having embedded system modules may include a plurality of embedded systems that require a shared data resource, such as provisioning data, to complete the starting of the embedded system modules. The starting may be an initial starting of the embedded system modules or subsequent restarts. The present invention generally includes a system and method for staggering the starting of the embedded system modules during a boot/reboot, such as boot/reboot that may be necessitated by an initial set-up of the optical node, a power failure, by an abnormal condition in one or more of the electrical systems of the optical node, or a boot/reboot required after servicing/upgrading hardware or software components of the optical node.

Figure 1:
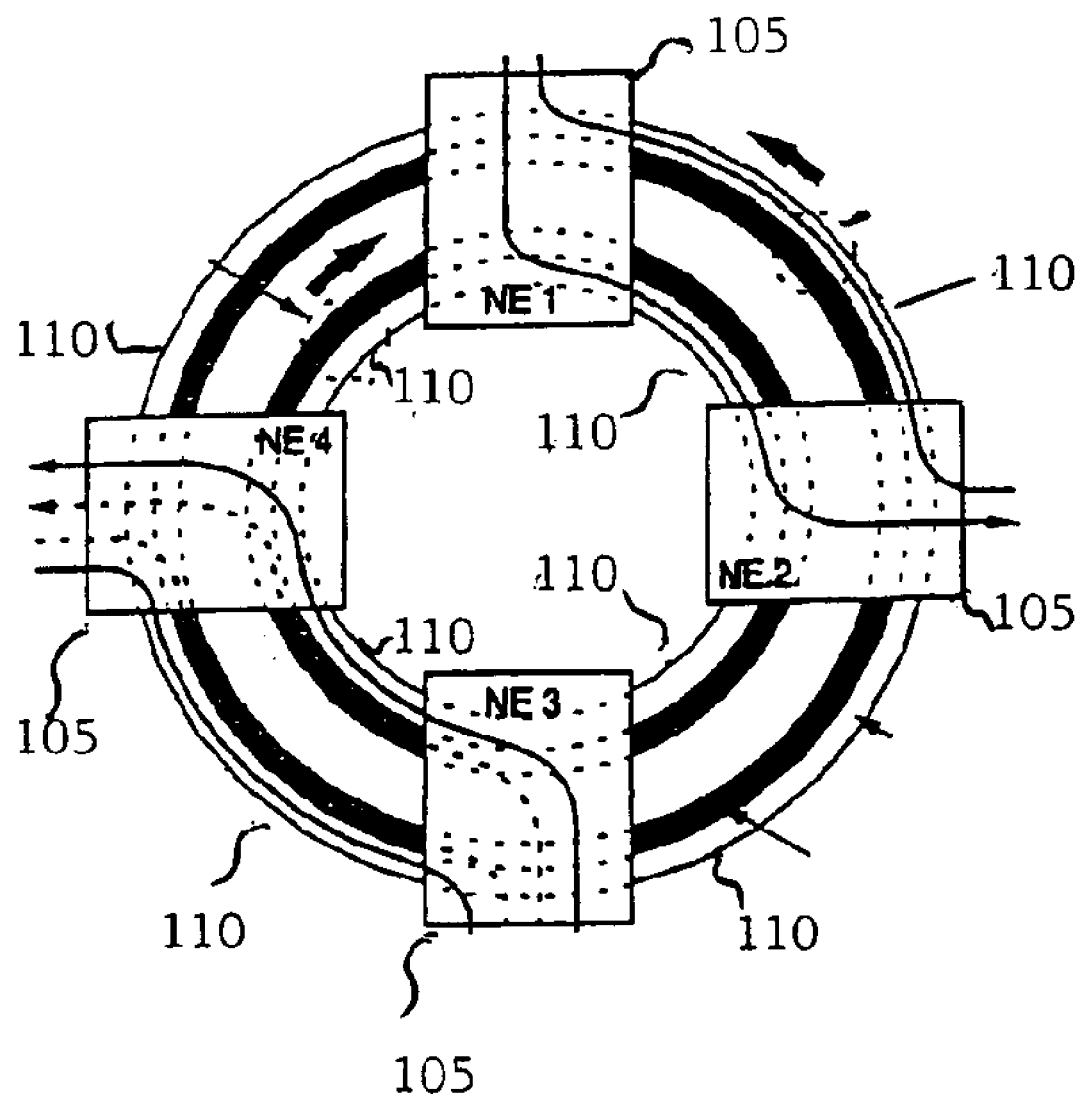
FIG. 1 is a block diagram of a prior art optical network.
Figure 2:
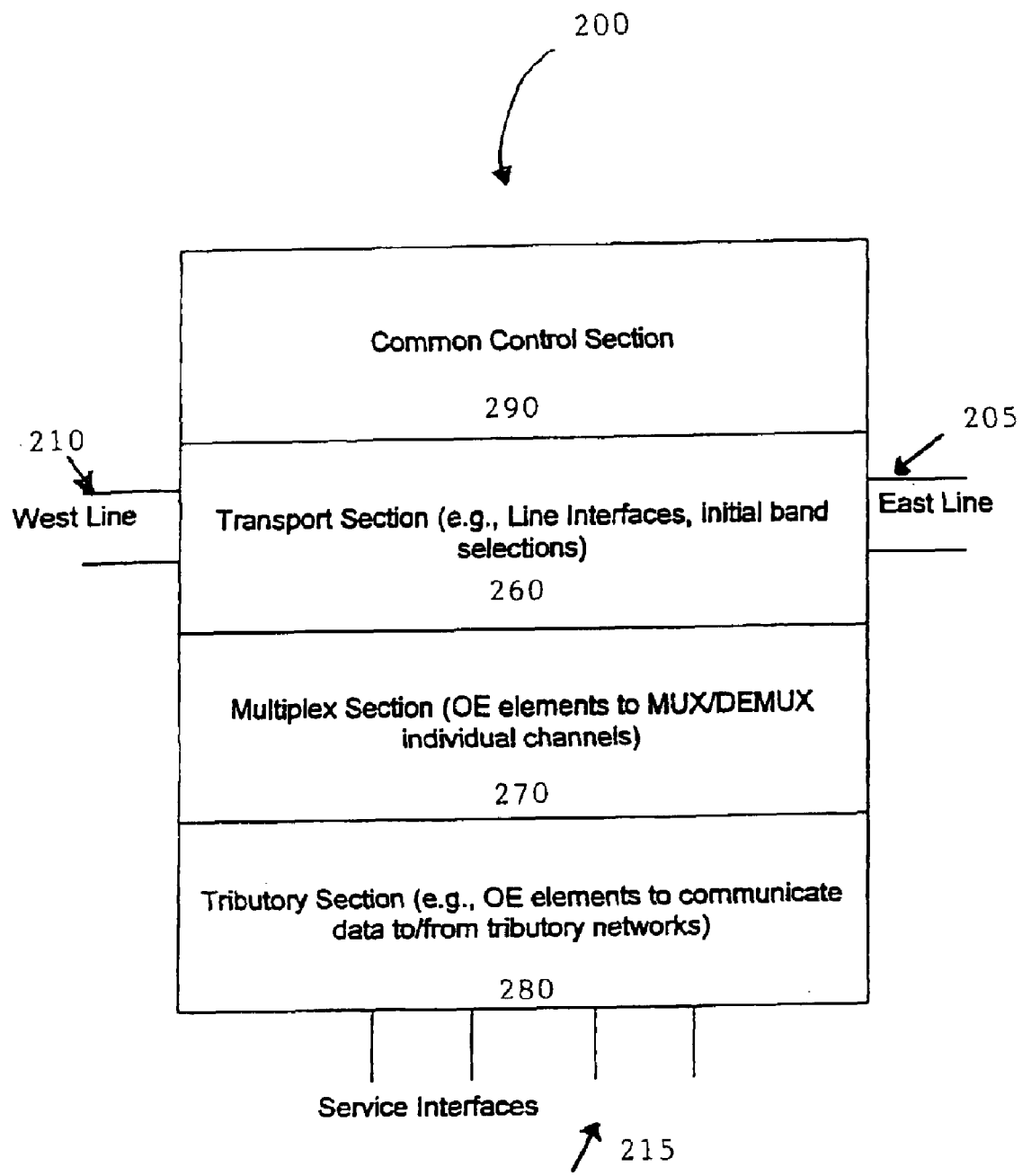
FIG. 2 is a functional block diagram of a prior art optical node.
Figure 3:
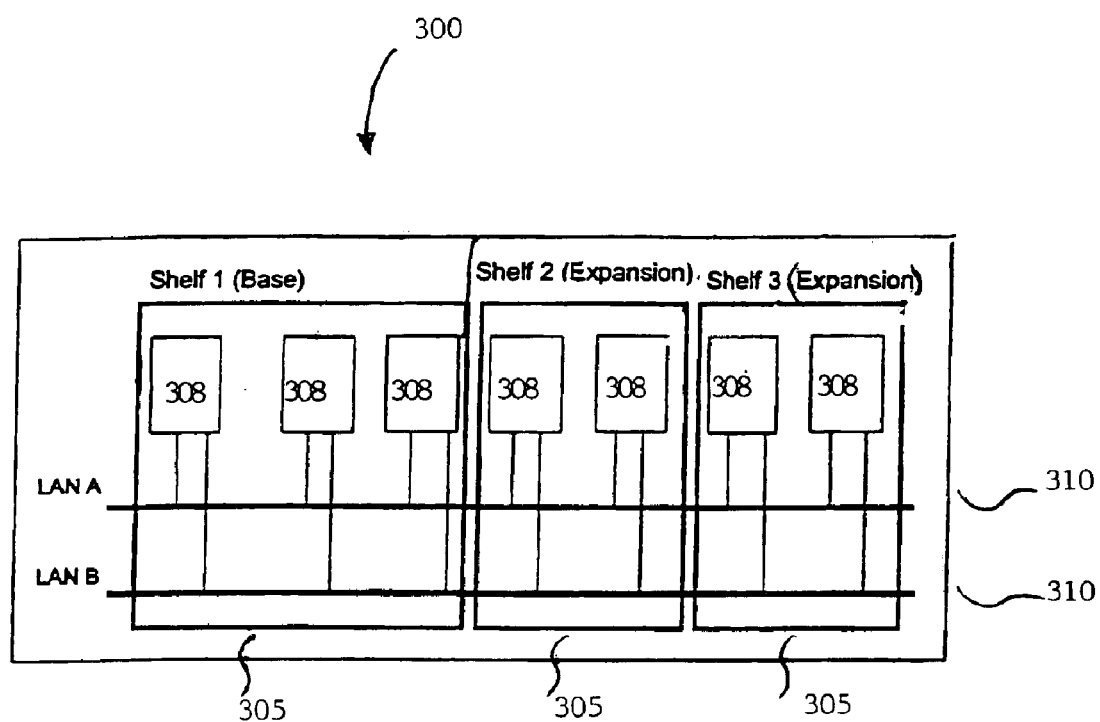
FIG. 3 is a block diagram of a prior art optical node implemented as plurality of modules electrically coupled by a local area network.
Figure 4:
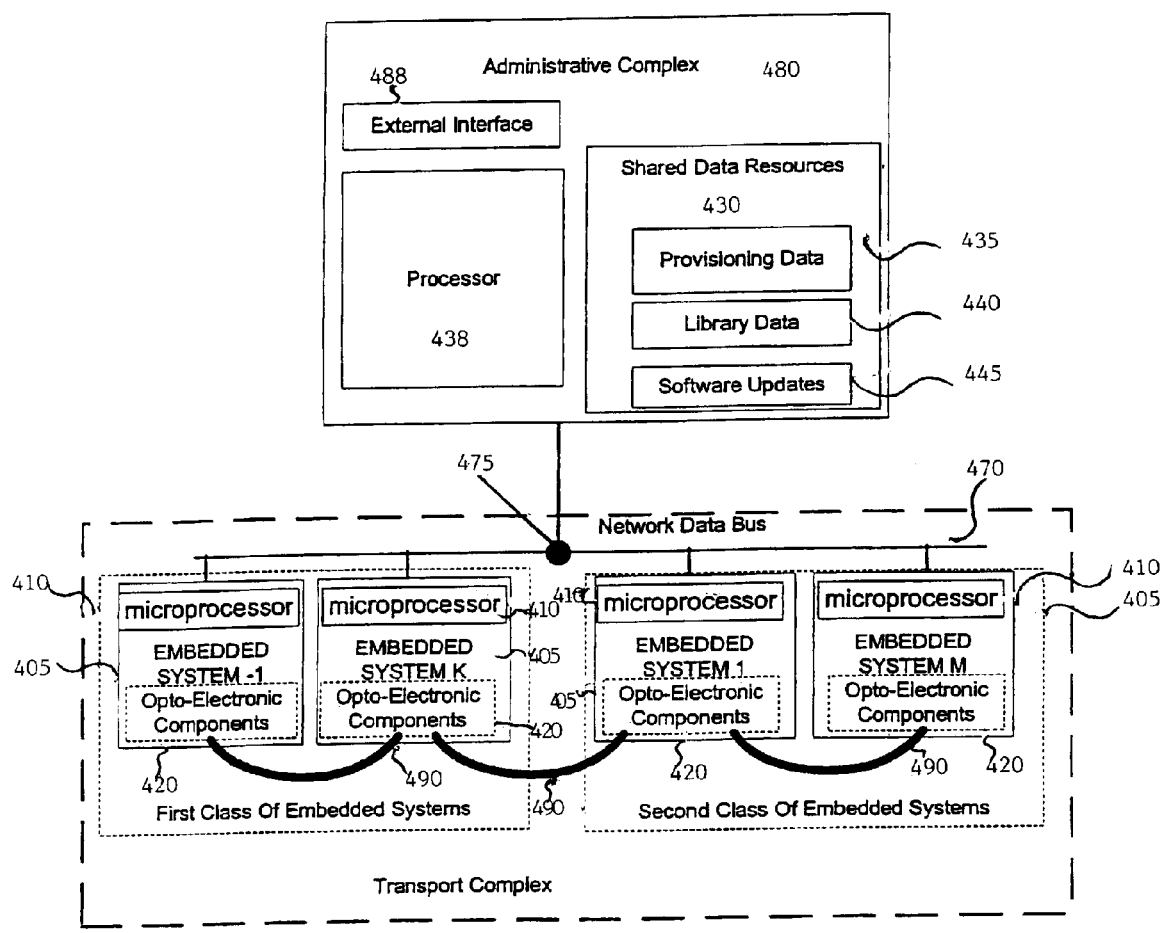
FIG. 4 is a block diagram illustrating a system for practicing the method of the present invention.

FIG. 4 shows an optical node 400 including a plurality of embedded system modules 405. Each embedded system module 405 may include one or more opto-electronic components 420. A microprocessor 410 residing on the embedded system module 405 may have substantial local responsibility for its associated opto-electronic components 420. It preferably includes a software application for performing monitoring, control, or regulation tasks of the opto-electronic components 420. The embedded system modules 405 may be part of a larger transport complex 450 for providing the optical transport functionality of optical node 400. Each of the opto-electronic components 420 preferably has an optical port (not shown in FIG. 4) for coupling optical signals with the opto-electronic components of other embedded system modules. This permits optical connectors 490 (e.g., optical fiber segments, sometimes known as "optical fiber pigtails") to be used to couple the opto-electronic components 420 of the embedded system modules 405 together. For a dense wavelength division multiplexing application embedded system modules 405 may perform a variety of functions such as: dense wavelength division multiplexing, optical tributary access, optical amplification, an optical service channel, optical protection switching, internal node communication and surveillance functions. In one embodiment, each embedded system module 405 is implemented as a circuit pack with each circuit pack designed to fit into a slot in a shelf of a mounting rack of the optical node.

An administrative complex 480 provides high-level monitoring and management of activities within the optical node and preferably includes operations, administration, maintenance, and provisioning (OAM&P) features. Administrative complex 480 includes a control processor 438. In one embodiment, control processor 438 is a microprocessor capable of running a real time operating system (e.g., WINDOWS NT). A non-volatile memory storage element (not shown in FIG. 4) is preferably coupled to control processor 438 to store configuration, status, or other forms of data that must survive a power loss to control processor 438. An external interface 488 is preferably included for administrative complex 480 to receive data from other nodes and/or from a network management system.

When the embedded system modules 405 are initially started or restarted, they must work cooperatively to provide the desired optical function for the node. Administrative complex 480 includes shared data resources 430 that some or all of the embedded system modules 405 require during a start process. This may include provisioning data 435 to provision the embedded system modules to work interactively with other embedded system modules, library data 440, and software updates 445 to ensure that each embedded system module is running the correct software. Provisioning data 435 may comprise any information that informs an embedded system module of the function that it needs to perform in the optical node. Administrative complex 480 may be implemented as one or more modules (e.g., one or more circuit packs), although it will be understood that it may also be implemented as a conventional computer system. In one embodiment all of the modules of the administrative complex 480 reside within the node, although it will also be understood that modules of the administrative complex 480 may be shared across the optical network (e.g., by using a dedicated optical channel to communicatively couple modules of the administrative complex across the optical network). In a preferred embodiment, an operating optical node stores the shared data resource on a non-volatile memory for restarting the optical node. However, it will be understood than an initial starting of the optical node may require the administrative complex 480 to first acquire the shared data resource.

A network data bus 470 couples the microprocessors 410 of each embedded system module 405 to the administrative complex 480. Data bus 470 may also include a hub 475. In one embodiment, data bus 470 is an Ethernet data bus and hub 475 is an Ethernet hub. A messaging application protocol interface (API) is preferably used to facilitate the communication and synchronization of tasks between the modules. In one embodiment each embedded system module 405 is assigned a network address (e.g., an Internet Protocol address) based upon its slot number and shelf number within a rack of the node.

A start process in optical node 400 typically includes steps at the administrative complex and in each embedded system module to turn on the administrative complex, turn-on individual embedded system modules, enable message traffic across the network data bus, ensure that all of the embedded system modules have the required software loads, and provide provisioning data and library data required by the embedded system modules to work interactively to provide the desired optical function of the optical node. In one embodiment a boot loader application residing in a non-voltatile memory is used to initiate a booting of each embedded system module 405. The boot loader may perform a variety of functions, including executing a circuit pack diagnostic, obtaining an application load if none is available, providing information about the nature of the instant start to the application load, maintain a boot loader history, and providing user information during boot loader execution. In one embodiment the boot loader preferably uses a modified bootstrap protocol (BOOTP) protocol to acquire network addresses (Internet Protocol addresses) with module receiving a network addressed based upon its physical location (e.g., based upon slot number and shelf number within a rack). A start manager software application may be included in the administrative complex and in each embedded system module.

In optical node 400 all of the embedded system modules 405 must be completely started/restarted for the optical node to be fully operational and provide all of the desired optical functionality. Typically, a substantial percentage of the embedded system modules 405 will require provisioning data from the shared data resource in order to interact with the other embedded system modules 405. If all of the embedded system modules 405 requiring provisioning data are booted/rebooted at the same time and have a start state machine executing the same sequence of start steps a large number of nearly simultaneous requests for provisioning data would be generated. This would result in congestion of the network data bus and an overload of the queue for accessing the shared data resource.

In accord with the present invention, congestion and overloading effects may be reduced by staggering the progression of the start process of individual embedded system modules over a time period selected to reduce congestion and/or overloading effects. In one embodiment, message traffic associated with requests for provisioning data from the shared data resource are staggered by including a time delay at a step in the progression of the start process of individual embedded system modules 405 prior to the receipt of the provisioning data.

Figure 5:
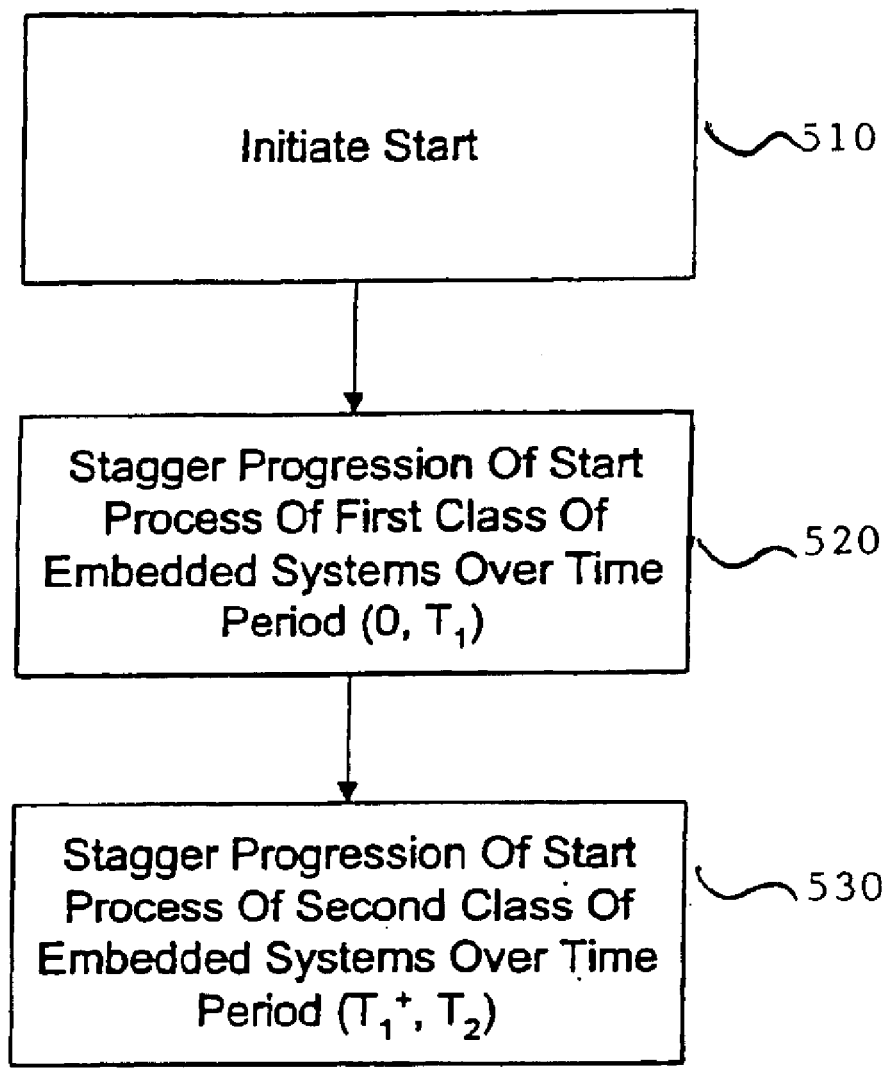
FIG. 5 is a flow chart of a method of staggered starts.

FIG. 5 is a block diagram of a method of starting the embedded system modules of an optical node. A start/restart process is initiated 510 in an optical node. The modules may be divided into classes of embedded systems (ES) as indicated in FIG. 4. Modules not dependent upon other modules for their activation comprise a first class of modules. Modules requiring that the first class of modules be completely started prior to their start comprise a second class of embedded system modules. For example, a module in the second class may require provisioning data or otherwise be dependent upon one or more modules of the first class being fully operational for a successful start. If required, this can be continued upward to higher class levels, with each successively higher class level requiring that all lower-level class levels be previously started. An additional class of modules may also be included corresponding to modules not requiring provisioning data, which may be blocked until other modules are fully started.

In one embodiment, a time range is selected for each class over which the progression of a selected step of the start process for that class is to be staggered to distribute message traffic to the administrative complex. For example, the start progression of modules corresponding to a first class of embedded system may be staggered 520 over a time period (0, T1) whereas the start progression of modules corresponding to a second class of embedded systems 530 may be staggered over a time period (T1, T2). In one embodiment the time ranges are selected so that 90% or greater of the start message traffic of the class of embedded system modules is completed. The time periods may be selected empirically to reduce congestion of the network data bus and overloading of the central processor for desired number of embedded system modules, a particular network data bus speed, and a particular central processor. For example, during a testing phase the time period may be empirically adjusted to determine a time range that improves the start. Typically, congestion and overloading effects are more severe problems for data networks having a larger number of embedded system modules requesting provisioning data, a slow network data bus, and a slow processor.

Referring again to FIG. 5, the staggering is preferably selected to distribute message traffic from the embedded system modules and the administrative complex (e.g., message traffic associated with providing provisioning data to each embedded system module). In one embodiment, the staggering is based upon a pre-selected time offset to delay the progression of the start process for each successive embedded system module of a class. As an illustrative example, if there are twenty embedded system modules, a step in the start process associated with a particular embedded system module indicating that is it ready to receive provisioning data may be selected. Each of the twenty embedded system modules may be assigned a preselected time delay. For example, if a desired stagger is 10 seconds, each successive embedded system module may be assigned a delay time of n*0.5, where n is the integer number assigned to a particular embedded system.

Figure 6:
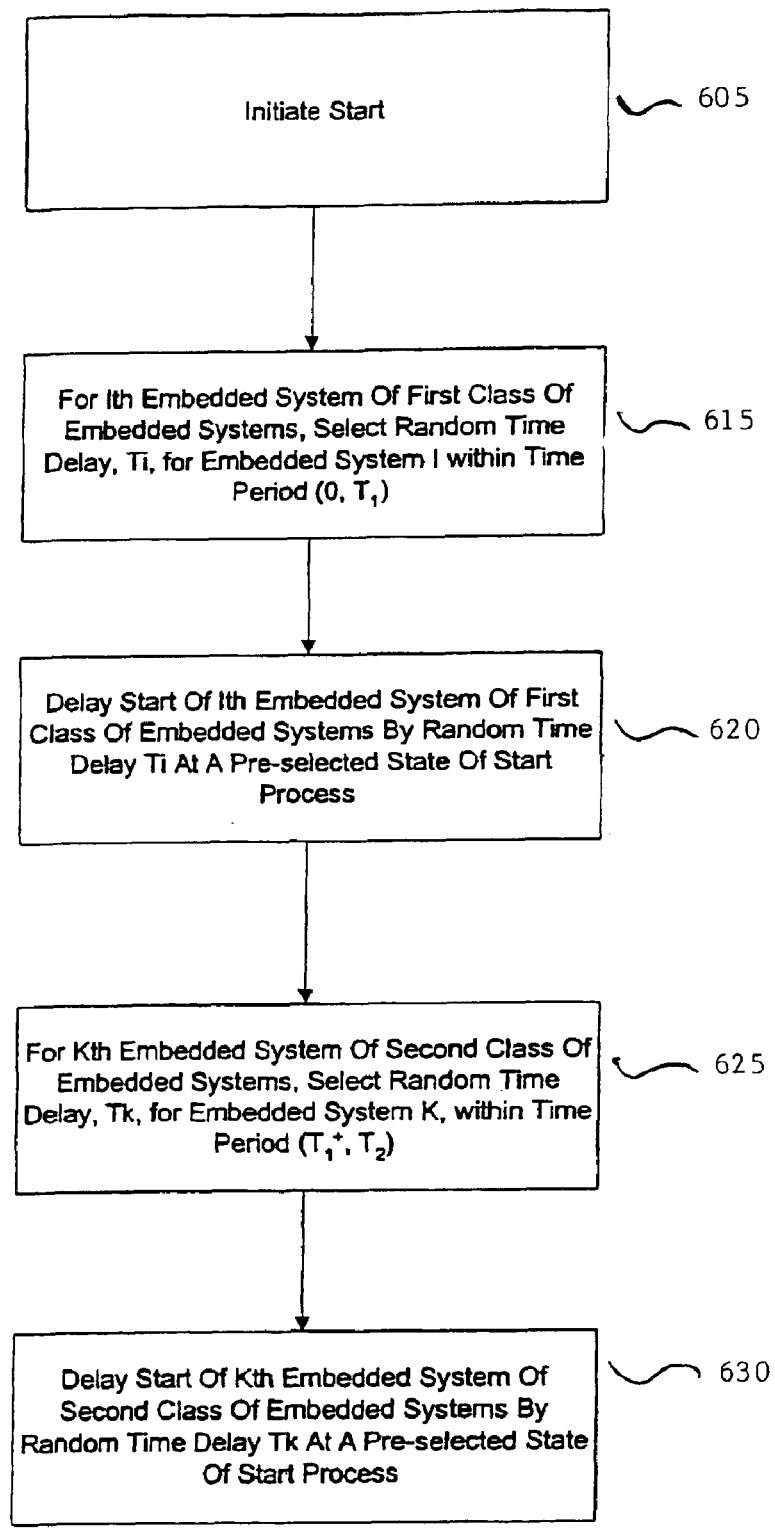
FIG. 6 is a flow chart of a method of staggered starts with random time offsets within a pre-selected range of time offsets.

In one embodiment a random number generator is used to select a random delay time within the time range of the class (e.g., the time delay is $t_c+\Delta t$, where $t_c$ is a time offset for the class and Δt is a random time delay with a pre-selected maximum value, tmax. This results in a random start-order sequence for the embedded system modules. Additionally, the start order sequence of a class of embedded system modules has a predictable start and completion time. Referring to the flow chart of FIG. 6, in one embodiment, a start is initiated 605. For each embedded system of a particular class of embedded systems, a random time delay is selected within a pre-selected time range 615, 625. The start of a particular embedded system within each class is delayed at a pre-selected state of the start process by its random time delay (and any constant time delay of the class) 620, 630.

Figure 7:
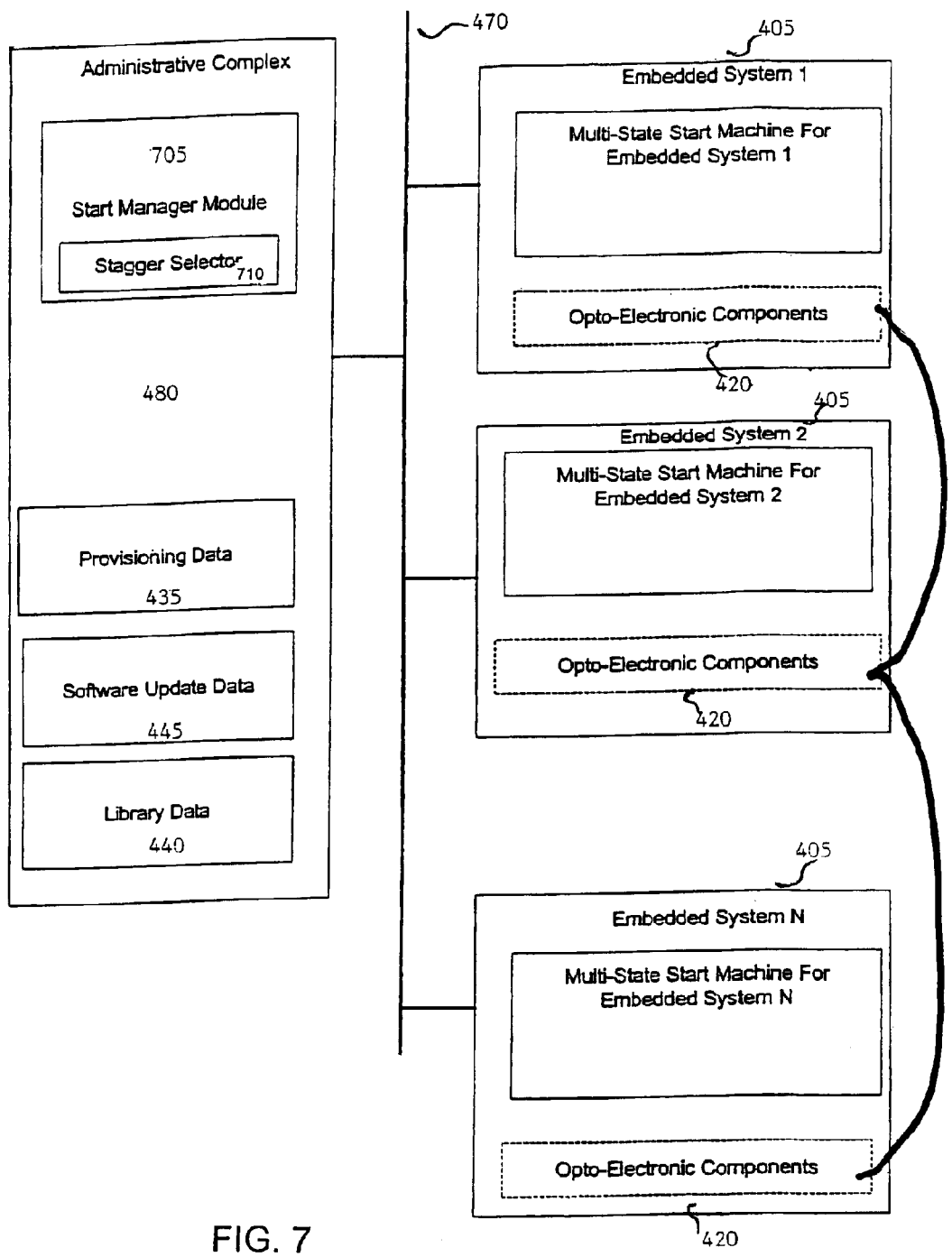
FIG. 7 shows a software module residing on an administrative complex for implementing a staggered start.

It will be understood that the software functionality for staggering the start progression of embedded system modules 405 may reside solely in the administrative complex, reside solely in each embedded system module, or its function may be distributed between the administrative complex and each embedded system module. In one embodiment, the administrative complex selects a time delay for starting each embedded system module 405. Referring to FIG. 7, in one embodiment the administrative complex includes a start manager module 705 having a selector sub-module 710 for selecting a time delay to transmit a message or response that delays the progression of the start of a particular embedded system.

Figure 8:
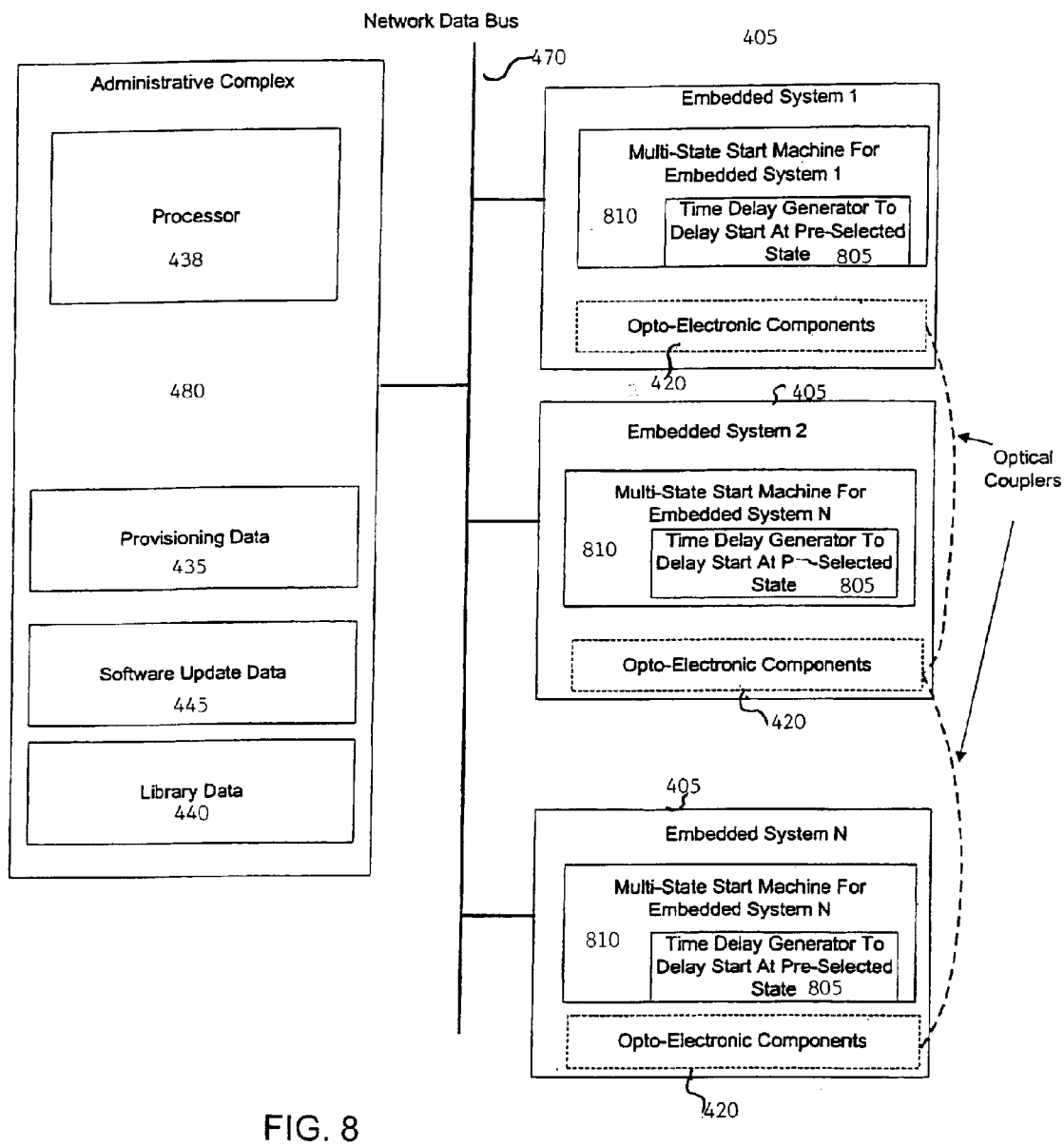
FIG. 8 shows a software module residing on an embedded system module for implementing a staggered start.
Figure 9:
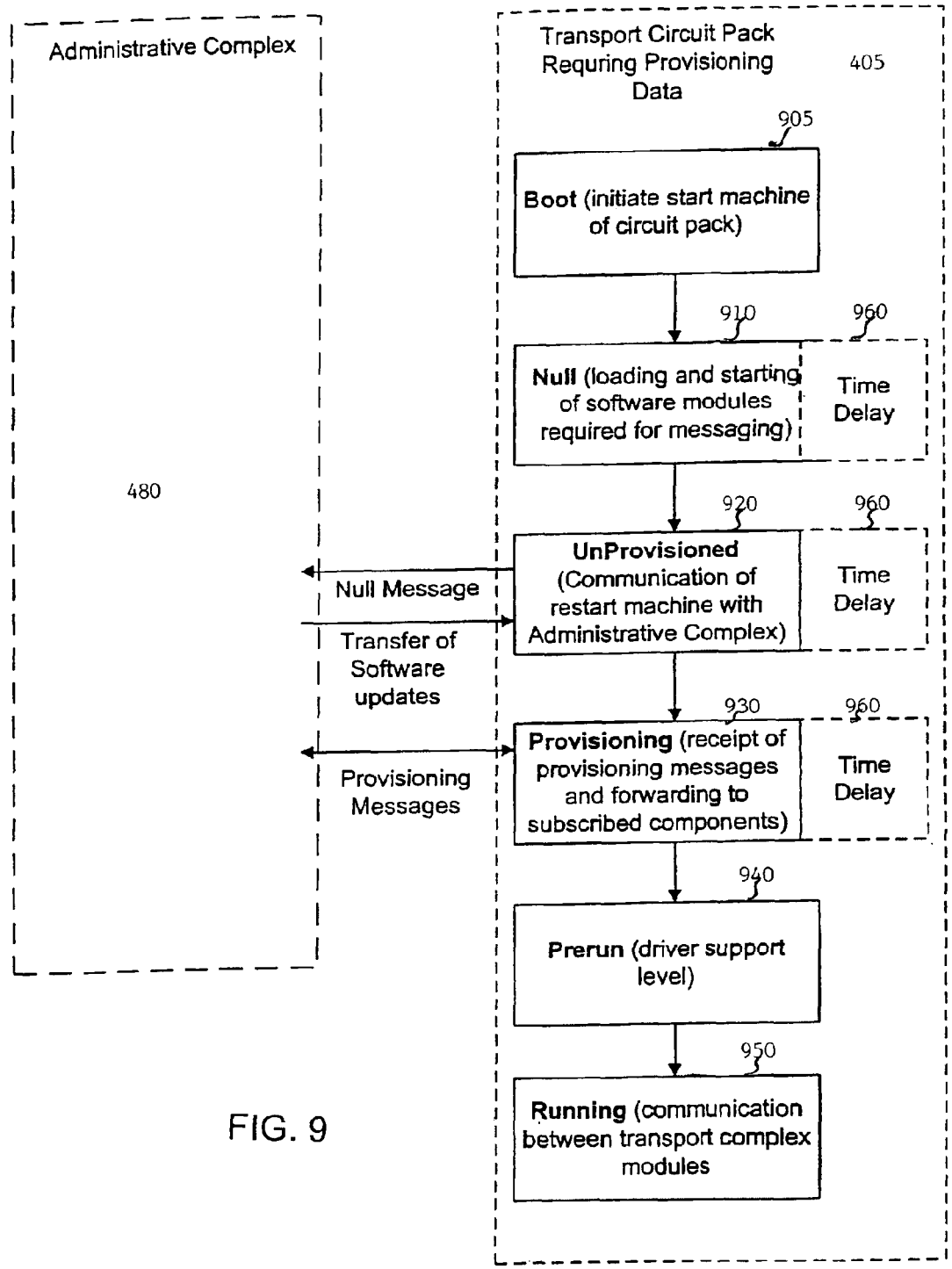
FIG. 9 is a flow chart showing an example of start state machine for the implementation of FIG. 8.

In another embodiment, a software module for staggering the start progression resides on the microprocessor of each embedded system module 405. As indicated in FIG. 8, a time delay generator 805 (e.g., a random number generator selecting a random time delay within a pre-selected time range) is included to delay the start of a multi-state start machine 810 at a pre-selected state. FIG. 9 shows an illustrative example of a sequence of steps executed by a multi-state start machine for the embodiment of FIG. 8. In an initial boot step 905 the start machine is started. The start state machine advances to a null state 910. In the null state, loading and starting of a software module required for messaging is performed. The start state machine then enters an un-provisioned state 920. In this state, the start state machine communicates a null message to the administrative complex to receive software updates, preferably using a text file transfer protocol (TFTP). During a provisioning step 930 the administrative complex sends a sequence of provisioning messages to the start machine to provide provisioning data. The start machine may then forward these messages to components which have subscribed to receive them. In a prerun state 940, the start state machine may provide support of some drivers. In a running state 950 is the first state where communication between modules occurs. As illustrated in FIG. 9, a random time delay 960 may be included to delay the progression of any state prior to the receipt of the provisioning data This may include adding a time delay at the null state, the unprovisioned state, or at the beginning of the provisioned state.

As previously discussed, one benefit of the present invention is that it permits a beneficial improvement in the speed at which the embedded system modules of an optical node boot/reboot. As is well known, the congestion of a data bus, such as an Ethernet bus, leads to a large latency once a threshold rate of traffic is exceeded because a burst of message traffic creates a large overhead that must be supported. Moreover, overloading of a central processor also cause a large latency due to the overhead of handling a large request queue. By staggering the progression of the start process of the embedded system modules congestion and overloading effects are reduced, resulting in an improvement in the speed of starting all of the optoelectronic modules. Since an optical node may be inoperable until all of the opto-electronic modules are fully started, the present invention provides an significant systems benefit.

Another benefit of the present invention is that it may also be adapted to identify and eliminate software errors during testing. The opto-electronic modules of an optical node typically are interdependent since they form an interacting optical system. For example, some opto-electronic modules may require data or other resources from other modules in order to successfully start. This may cause software errors based upon the startup order timing. Identifying subtle timing errors using conventional approaches is difficult because some small changes in timing may occur naturally during field use, replacement, and upgrading of components. For an optical node having an integer number, n, of opto-electronic modules there are n! possible startup sequences. For an optical node having a large number of circuit packs (e.g., 50-to-200 circuit packs) it may be difficult using conventional methods to identify and fix subtle software timing errors due to the large number of possible startup sequences during the lifetime of the optical node.

Figure 10:
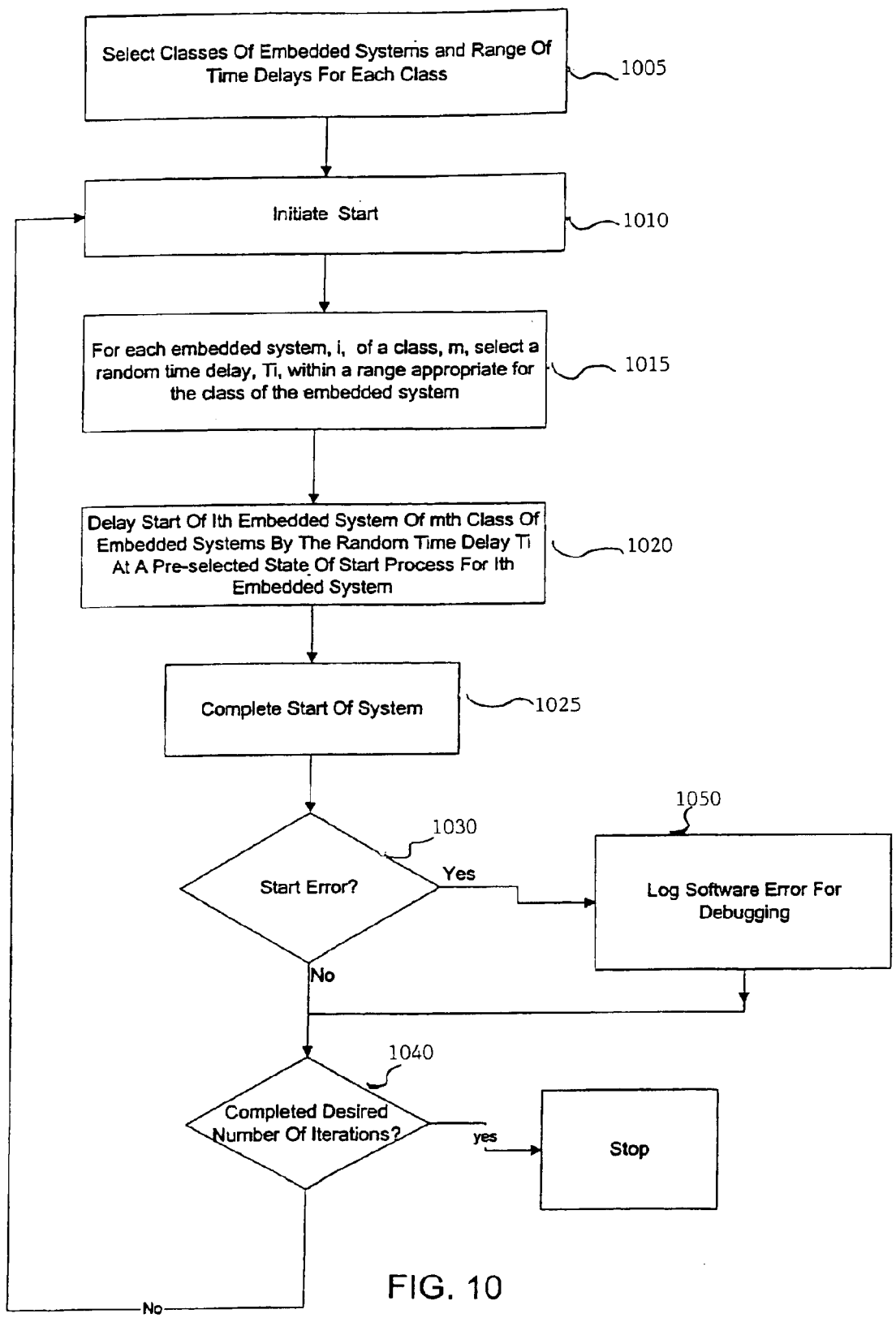
FIG. 10 is a flow chart showing a method of using staggered starts to identify software errors.

In one embodiment of the present invention a random start order sequence is used to identify subtle timing errors. In an optical node having an integer number, n, of embedded system modules there are n! (n factorial) possible start-order sequences of the embedded system modules. During the initial fabrication and evaluation of an optical node a manufacturer may attempt to fix the start-order sequence. However, in actual field use, the actual start-order sequence may drift over time to changes in operating environment, changes in components, and other factors. A consequence of this is that subtle software timing errors may occur during the lifetime of the optical node. For example, if embedded system module "A" requires a resource from embedded system module "B", a change in start order sequence that starts "B" before "A" would lead to a start error. Referring to FIG. 10, the present invention may be applied to create a distribution of start-order sequences during a testing phase, permitting subtle timing errors to be identified and debugged. As shown in FIG. 10, an initial classification of the embedded systems may be performed 1005 into one or more classes. For each class, an initial fixed time offset is selected along with a range of time delays for a random time delay offset. The range of time delays are preferably selected to correspond to a potential range of time delays larger than those expected during field use. A start is initiated 1010. For the embedded system of each embedded system module, a software application, preferably residing on the embedded system module, selects a random time delay for the module within the range of time delays selected for the modules' class 1015. The start of the embedded system is then delayed at a preselected state 1020 by the constant time offset appropriate for the class of the embedded system module and by the random time delay. This results in a completion of the start 1025. A decision branch 1030 in the process occurs depending upon whether there is start error. If the start is successful (i.e., no errors) the start is initiated again until a desired number of iterations 1040 are completed (e.g., 10,000 iterations). The number of iterations is preferably selected to be sufficiently large to test a large number of start-order sequences. If a start error occurs, it is logged for debugging 1050.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In an optical node having a plurality of embedded system modules each having a restart process for restarting the embedded system module, a method of restarting the optical node comprising:
   selecting a time range for staggering the restarting of the embedded system modules;
   responsive to a restart condition, selecting for each embedded system module a time delay within the time range, forming a distribution of time delays for the plurality of embedded systems; and
   delaying the restart process of each of the embedded system modules by its corresponding time delay to stagger the restarting of the plurality of embedded system modules over the time range.

2. The method of claim 1, wherein the restart process of each embedded system module is staggered by delaying a step in the restart process of each embedded system module by a random delay time within the time range.

3. The method of claim 2, wherein a network data bus couples the embedded systems modules to a control complex having a processor and a shared data resource, the method further comprising:
   selecting the time range to distribute message traffic associated with providing the shared data resource to the plurality of embedded system modules.

4. The method of claim 3, wherein the time range is selected to reduce congestion of the network data bus or to reduce overloading of the processor.

5. The method of claim 1, the optical node including a backplane data network communicatively coupling the embedded system modules, the method further comprising:
   selecting the time range in order to reduce congestion in the backplane data network of the optical node.

6. In an optical node having a plurality of opto-electronic embedded system modules communicatively coupled by a network data bus to a processor having a shared data resource for restarting each of the embedded system modules, a method of restarting the embedded system modules, the method comprising:
   selecting a time range to stagger the restarting of the embedded system modules;
   initiating a restart of the embedded system modules;
   for each embedded system module, selecting a time delay within the selected time range to form a distribution of time delays for the plurality of embedded system modules; and
   for each embedded system module, delaying execution of a restart step associated with the embedded system module accessing the shared data resource by the time delay selected for the embedded system module.

7. The method of claim 6, wherein the time delay selected of each embedded system module is a random time delay within the pre-selected time range.

8. The method of claim 6, wherein the time range is selected to distribute message traffic over a sufficiently long period of time to reduce congestion of the network data bus.

9. The method of claim 6, wherein the time range is selected to distribute data requests over a sufficiently long period of time to reduce overloading of the processor.

10. The method of claim 6, wherein the optical node includes a second plurality of embedded system modules coupled by the network data bus to the processor, the method further comprising:
    selecting a second time range beginning subsequent to the first time range;
    for each embedded system module of the second plurality of embedded system modules, selecting a time delay within the second time range to form a second distribution of time delays for the second plurality of embedded systems;
    for each embedded system module of the second plurality of embedded system modules, delaying execution of a restart step associated with the embedded system module by the time delay selected for the embedded system module.

11. The method of claim 6, the embedded system modules being mounted in a rack in the optical node, the network data bus being a backplane data bus, the method further comprising:
    selecting the time range in order to reduce congestion in the backplane data network of the optical node.

12. In an optical node having a plurality of embedded system modules coupled by a network data bus to an administrative complex having a processor and a shared data resource for restarting each of the embedded system modules, a method of restarting the embedded system modules, the method comprising:
    selecting a state of a restart process of each of the plurality of embedded system modules subsequent to which message traffic is generated between the embedded system module and the administrative complex for providing data from the shared data resource to the embedded system module;
    responsive to a restart condition, for each of the embedded system modules selecting a time delay within a pre-selected time range for delaying the execution of the selected state of the restart process for the embedded system module with the time delays of the plurality of embedded system modules being distributed over the time range; and
    delaying the execution of the selected state of each embedded system module by its associated time delay.

13. The method of claim 12, wherein the selected state is a state for which the embedded system requests or receives provisioning data from the shared data resource.

14. The method of claim 12, wherein the time range is selected to be sufficiently long to reduce congestion of the data bus.

15. The method of claim 12, wherein the time range is selected to be sufficiently long to reduce overloading of the administrative complex.

16. The method of claim 12, wherein the time delays are randomly distributed over the time range.

17. The method of claim 12, wherein the time delays are distributed uniformly over the time range.

18. The method of claim 12, further comprising a second plurality of embedded system modules that is dependent upon the first plurality of embedded system modules, the method further comprising:
    selecting a state of a restart process of each of the second plurality of embedded system modules subsequent to which message traffic is generated between the embedded system module and the administrative complex for providing data from the shared data resource to the embedded system module;
    responsive to a restart condition, for each of the embedded systems modules selecting a time delay within a preselected second time range for delaying the execution of the selected state of the restart process for the embedded system module with the time delays of the second plurality of embedded system modules being distributed over the second time range; and delaying the execution of the selected state of each embedded system module of the second plurality of embedded system modules by its associated time delay;

the second time range selected to begin subsequent to the first time range.

19. The method of claim 12, the embedded system modules being mounted in a rack in the optical node, the network data bus being a backplane data bus, the method further comprising:

selecting the time range in order to reduce congestion in the backplane data network of the optical node.

20. In an optical node having a plurality of embedded system modules communicatively coupled by an network data bus to a processor having a shared data resource for restarting each of the embedded system modules, a method of obtaining information for debugging embedded system software, the method comprising:

selecting a time range corresponding to a potential variance in timing between embedded system modules during the lifetime of the optical node;

initiating a plurality of restart instances;

responsive to each restart instance, for each of the embedded system modules selecting a random time delay within the time range and delaying the restarting of each embedded system module by its associated random time delay, forming a random start-order sequence of the embedded system modules for each reboot instance; and for each restart instance of the plurality of reboot instances, logging restart error instances.

21. In an optical node having a plurality of embedded system modules coupled by a data network bus to an administrative complex having a processor and a shared data resource for restarting each of the opto-electronic embedded system modules, a method of obtaining information for debugging embedded system software, the method comprising:

selecting a state of a restart process of each of the plurality of embedded system modules subsequent to which message traffic is generated between the embedded system module and the administrative complex for providing data from the shared data resource to the embedded system module;

selecting a time range corresponding to a potential variance in timing between embedded system modules during the lifetime of the optical node;

initiating a plurality of restart instances;

responsive to each restart instance, for each of the embedded system modules selecting a random time delay within the time range;

for each restart instance, delaying the execution of the selected state of each embedded system module by its associated random time delay; and for each reboot instance, monitoring the restart process and logging restart error instances and information for debugging the error.

22. An optical node for an optical network, comprising:

a plurality of embedded system modules each having a microprocessor and at least one opto-electronic component;

an administrative complex having a shared data resource for restarting the embedded system modules;

a network data bus coupling the embedded system modules to the administrative complex;

optical connectors for coupling optical signals to the opto-electronic components of the embedded system modules; and restart means for staggering the restarting of the embedded system modules over a pre-selected time range.

23. The optical node of claim 22, wherein the embedded system modules are mounted in a rack in the optical node, the network data bus is a backplane data bus coupling the embedded system modules, and the start means is adapted to stagger the starting of the embedded system modules in such a way as to reduce congestion in the backplane data bus.

24. An optical node for an optical network, comprising:

a plurality of embedded system modules, each embedded system module including a microprocessor and at least one opto-electronic component;

a control microprocessor;

a database resource communicatively coupled to the control microprocessor including provisioning data for restarting the embedded system modules;

a network data bus communicatively coupling the embedded system modules to the control microprocessor;

optical connectors for coupling optical signals between the opto-electronic components of the embedded system modules; and a restart software application residing on at least one microprocessor of the node for staggering the restarting of the embedded system modules over a pre-selected time range.

25. The optical node of claim 24, wherein the restart application includes a restart machine having a plurality of restart states for each embedded system module, the restart state machine adapted to include a time delay prior to a state for which the embedded system module receives provisioning data from the control microprocessor.

26. The optical node of claim 25, wherein one restart machine resides on the processor of each embedded system module and is configured to calculate a random time delay within a pre-selected range of time delays to hold the restart state machine in an unprovisioned state.

27. The optical node of claim 25, wherein one restart machine resides on the processor of each embedded system module and is configured to calculate a random time delay within a preselected range of time delays to hold the restart machine in a null state.

28. The optical node of claim 24, wherein the embedded system modules are mounted in a rack in the optical node, the network data bus is a backplane data bus coupling the embedded system modules, and the start software application is adapted to stagger the starting of the embedded system modules in such a way as to reduce congestion in the backplane data bus.

* * * * *